United States Patent [19]

Murai

[11] 4,234,876
[45] Nov. 18, 1980

[54] OMNIDIRECTIONAL MOVE-STOP SENSOR

[75] Inventor: Hiroshi Murai, Tokyo, Japan

[73] Assignees: Riken-Denshi Kogyo Kabushiki Kaisha; Morimura Shoji Kabushiki Kaisha, both of Tokyo, Japan

[21] Appl. No.: 798,939

[22] Filed: May 20, 1977

[30] Foreign Application Priority Data

Oct. 19, 1976 [JP] Japan .................................. 51-125384
Oct. 27, 1976 [JP] Japan .................................. 51-128244

[51] Int. Cl.³ ...................... G08B 23/00; A01K 15/00
[52] U.S. Cl. ...................................... 340/573; 119/29; 307/117; 390/384 E; 390/566
[58] Field of Search ............... 340/261, 262, 279, 573, 340/566, 384 E, 52 H, 61; 307/117; 310/329; 338/47, 43, 225, 223, 334, 100; 119/29

[56] References Cited

U.S. PATENT DOCUMENTS

| 2,455,472 | 12/1948 | Curl et al. | 340/384 E |
| 3,336,530 | 8/1967 | Sloan et al. | 340/261 |
| 3,631,271 | 12/1971 | Shimada | 310/329 |
| 3,697,982 | 10/1972 | Kawaki et al. | 340/384 E |
| 3,742,478 | 6/1973 | Johnson | 340/262 |
| 3,872,470 | 3/1975 | Hoerz et al. | 340/384 E |

FOREIGN PATENT DOCUMENTS 668406 3/1952 United Kingdom .
1134655 11/1968 United Kingdom .

Primary Examiner—Glen R. Swann, III
Attorney, Agent, or Firm—Toren, McGeady and Stanger

[57] ABSTRACT

The sensor disclosed attaches to the neck of a hunting dog for determining its physical behavior thereof. It includes a sensor proper having a movable ball confined in a closed space. A voltage producing device at least partly defines the walls of the closed space. A gate circuit is electrically connected with the voltage producing device. Further, a discriminating signal generator is electrically connected with the voltage producing device so the dog's master can determine the dog's behavior.

10 Claims, 16 Drawing Figures

OMNIDIRECTIONAL MOVE-STOP SENSOR

BACKGROUND OF THE INVENTION

This invention relates generally to an omnidirectional move-stop sensor, and it concerns more specifically a sensor of the above kind which is suitable for use in hunting games for determining whether the dog is moving, e.g., pointing or galloping.

A hunting dog patrols alongside his master by walking substantially in parallel and about 50 meters apart from his master until he finds a trace of birds. When he smells a bird, he will stop and point the target until his master releases him to attack it, at which moment the bird may fly and be shot by the gun of the master. In the other kind of hunting, for instance, fox hunting, rabbit hunting or deer hunting, the dog will patrol until he finds the target and then he will pursue it by galloping at high speed. In these cases, a good trained dog will beat the target in front of his master for shooting. Pointing and galloping are used so the dog will get in the fighting position for the target. The master utilizes the movement of the dog to shoot.

In the conventional art, a combination of an elastically suspended bar magnet is employed for cooperation with a stationary coil. When the hunting dog carries such a sensor unit is stationary, even if the dog is pointing, no current will be induced in the coil. This non-current state of the coil can be utilized electrically so as to issue alarm signals audible to the hunter. On the contrary, when the dog is galloping, the bar magnet moves up and down so that current will be induced in the coil which energized state can be utilized electrically to issue other different audible signals to inform the hunter that the dog is now in his pointing attitute.

Other conventional art utilizes a mercury switch carried by the hunting dog and in place of the foregoing magnet-coil combination.

Either of these conventional technique lacks of the desired omnidirectional characteristic, together with poor sensibility to the move-stop discriminating ability in the above mentioned sense.

SUMMARY OF THE INVENTION

It is, therefore, the main object of the invention to provide a move-stop discriminating sensor which works omnidirectionally with high sensitiveness to any instantaneous state of the moving body, preferably a living hunting dog, carrying the sensor unit.

This and further, objects, features and advantages over the prior art will be well understood when read the following detailed description of the invention to be set forth in comparison with the conventional art, with reference to the accompanying drawings.

DETAILED DESCRIPTION OF THE INVENTION

Referring now to the accompanying drawings, several preferred embodiments of the invention will be described in detail.

However, before discussing the invention, two known kinds of apparatus close to the present invention will be described at first and with reference to FIGS. 1 and 2.

Figure 1:
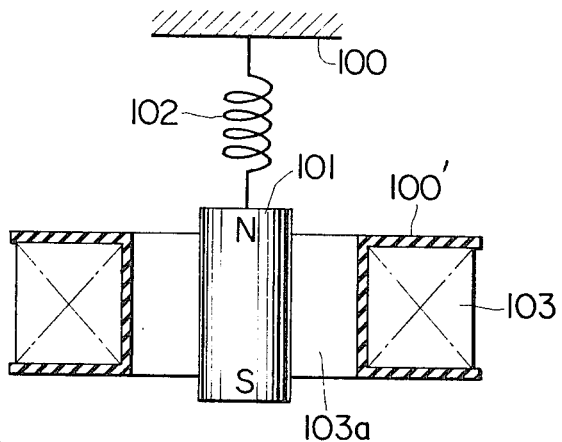
FIG. 1 is a schematic sectional drawing showing a preferred main part of a conventional move-stop sensor.

In FIG. 1, numeral 101 represents an inertia member made of a permanent magnet having magnetic poles N and S as shown, as an example. This member 101 is resiliently suspended through a spring 102 from a stationary member 100 such as a casing, which is attached to a movable body, such as a dog, preferably the neck thereof, which is being sensed for its moving or stop position.

A stationary solenoid coil 103 is wound on a bobbin frame 100' and has a core cavity 103a in which the inertia member 101 is movable up and down, depending upon the moving attitude of the dog, not shown. With movement of the inertia member, electric current will be induced in the coil 103. Although not shown, the frame 100' is rigidly connected with said stationary member 100.

It is a considerable drawback of this known apparatus that with any lateral movement of the inertia member, substantially no current will be induced. Thus, this known apparatus works only directionally and, therefore, not omnidirectionally.

Figure 2:
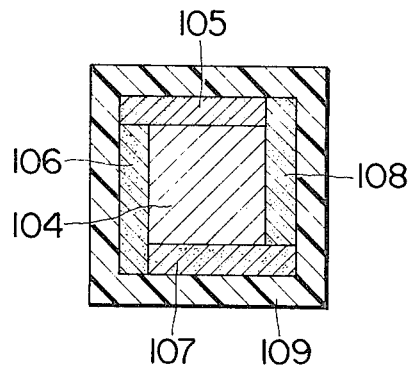
FIG. 2 is a similar sectional view of a second conventional sensor belonging again to the conventional art.

In the second known apparatus shown in FIG. 2, numeral 104 denotes a cubic core inertia member encircled which is tightly surrounded by and kept in contact with two pairs of piezoelectric elements 105; 107 and 106; 108, these pairs being preferably made of titanium porcelain sheets or the like and arranged perpendicularly to each other and tightly encased in a stationary casing 109 as shown. This casing is attached to the neck of a hunting dog. Although not shown, a third pair of piezoelectric elements can be arranged in contact with the front and rear remaining end surfaces of the hexagonal core inertia member 104 made of a heavy mass, for instance iron or lead. In this case, the apparatus may work substantially omnidirectionally, but it is highly difficult to sense a weak and slight movement of the inertia member, since, for the energization of any piezoelectric element is only realized by application of a substantial pressure. Therefore, this known apparatus can be used as an acceleration sensor, but does not operate as a fine move-stop sensor.

Figure 3:
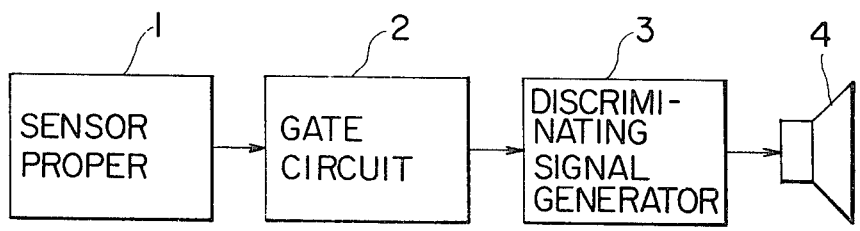
FIG. 3 is a block diagram showing the basic working parts of the sensor according to this invention.

Now turning to the embodiments of the present invention, numeral 1, FIG. 3, represents a sensor proper to be more specifically shown and described, the electrical output therefrom is applied to a gate circuit 2, so as to provide a control signal adapted for the control of a discriminating signal generator 3 electrically connected with an audiosignal generator 4 such as a speaker.

Figure 4:
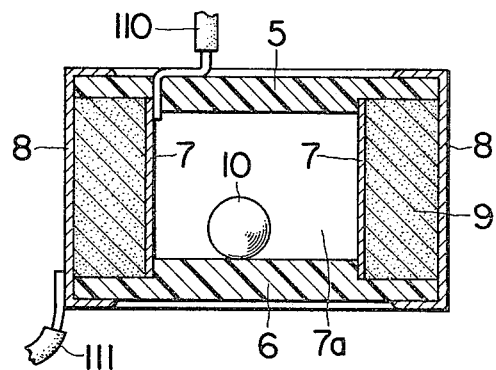
FIGS. 4 and 5 are sectional drawings showing two different embodiments of the sensor proper employable in this invention.

The sensor proper 1 can be in the form which is illustrated in FIG. 4.

In this embodiment, numerals 5 and 6 represent an upper and lower disk preferably made of insulating material and close the upper and lower open ends of an inside hollow cylinder member 7. Numeral 8 represents an outer hollow cylinder made of well conductive material such as brass, from which a lead 111 extends.

The both open ends of the outer cylinder are bent inwardly so as to fix the disks 5 and 6 firmly in position. Within the circular ring space 7a defined by and between these inner and outer cylinders 7 and 8, pulverized carbon 9 is filled, thus providing a kind of microphone. The inner cylinder 7 constitutes, in this case, a vibrating member as well as an electrode, from which another lead 110 extends. The outer cylinder 8 acts as the opposite electrode.

A ball-shaped inertia member 10 made of preferably heavy material such as lead is placed on the lower disk 6 and within the interior core space 7a which is defined by disks 5; 6 and the wall of inner cylinder 7.

Now it is assumed that the lower disk 6 of the sensor proper shown in FIG. 4 is fixedly attached to a movable body such as a dog's neck band, the inertia member 10 will roll on the disk 6 or fly within the core space 7a and impinge upon the inside wall of the inner cylinder 7, thereby varying electrical resistance of carbon powder mass 9 and providing after all a kind of electrical output. With movement of the dog's physical body, the ball 10 will impinge upon the inside wall surface of inner cylinder 7, possibly several times.

Figure 5:
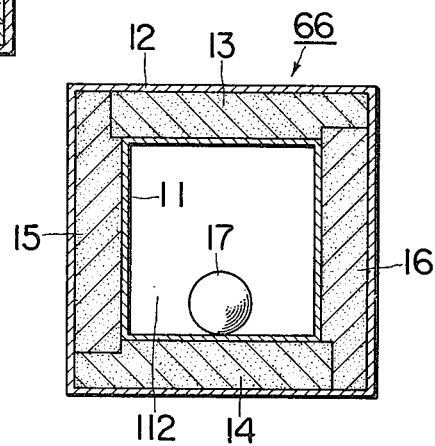
Figure 6:
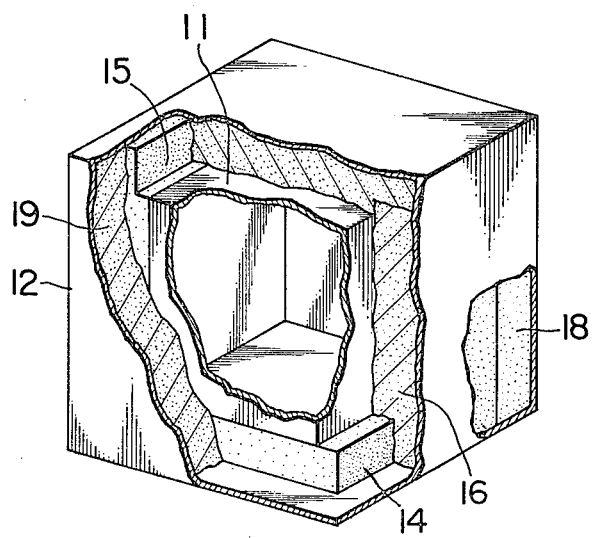
FIG. 6 is an enlarged perspective view of the second embodiment shown in FIG. 5, partially broken away, wherein however the ball element or inertia member has been omitted from the present drawing only for the clear representation thereof.

A further embodiment of the sensor proper is shown in FIGS. 5 and 6. Each mechanical shock caused by a collision of the inertia ball member 10 against the inside wall surface of inner cylinder will thus produce a sudden and substantial electrical output current from the microphone type sensor proper shown in FIG. 4.

FIGS. 5 and 6 show a further embodiment of the sensor proper employable in this invention and only roughly shown by numeral 1 in FIG. 3.

In FIG. 5, a hollow six sided unit is shown which comprises wall plates 13, 14, 15, 16 , . . . , made of piezolectric elements such as titanate porcelain and covered with inside electrode 11 and outside electrode 12.

Within the hollow core space 112 and on the lower electrode, there is provided a rigid ball inertia member 17 as before.

In FIG. 6, the same piezoelectric sensor unit shown in FIG. 5, is shown more specifically and in a partially broken-away perspective mode. Side walls 18 and 19 are equally piezoelectric elements as before and shown and described at 13. Thus, each of these walls 18 and 19 has inside electrode 11 and outside electrode 12, as before.

When the sensor proper shown in FIGS. 5 and 6 is attached to a movable body, preferably a dog's neck band, inertia member 17 will roll around and collide any of the walls 13, 14 . . . and against the inside electrode 11. Thus, each collision will induce an electrical output between the opposite electrodes 11 and 12 having respective outgoing leads as at 110 and 111, although these have been omitted from the drawing only for simplicity.

Figure 7:
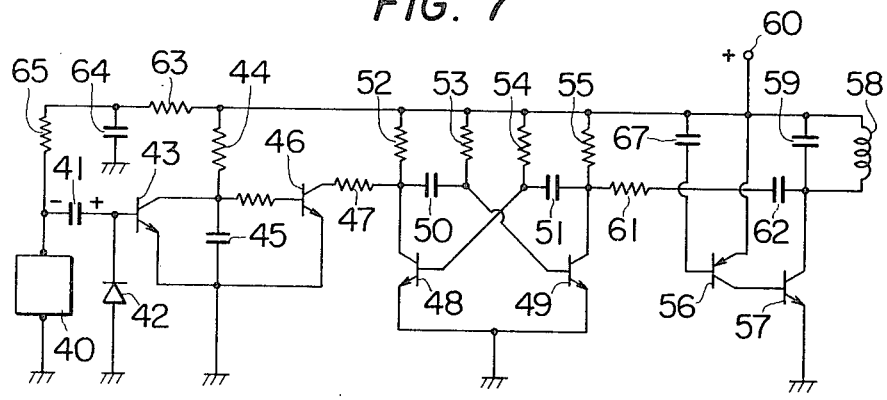
FIG. 7 is an electronic connection diagram of an electronic circuit employable in cooperation with the sensor proper shown either in FIG. 4 or 5.

This or these electrical output or outputs are further treated in the electronic circuit shown in FIG. 7, as an example. Numeral 40 represents a sensor proper which may be either of the foregoing two embodiments set forth hereinbefore.

Terminal 60 is connected to the positive side of a battery, say 3 volts. By the provision of resisters 63 and 65 and condenser 64, a stabilized voltage is always applied to the carbon powder mass 9 of the microphone type sensor proper as shown in FIG. 4, when the unit 40 is constituted by the latter, as an example.

When the inertia ball 10 collides against the wall of inside cylinder 7, FIG. 4, current flowing through the sensor 40 will be suddenly increased and condenser 41 is charged in such direction that current flows through rectifier 42. Each occurrence of such mechanical shock caused by the inertia ball, the condenser 41 is charged in the direction as denoted by plus and minus symbols shown in FIG. 7. Thus, in this case, condenser 41 and rectifier 42 act in combination as an integrator.

In this way, transistor 43 becomes conductive and condenser 45 will be discharged.

When the movable body, preferably a dog, does not move and is kept stationary, inertia ball will not be moved. Thus, the current flowing through the sensor 40 will not be suddenly increased and thus kept in its regular state. Therefore, condenser 41 is not subjected to charge and the input of transistor 43 is kept as its low level. Condenser 45 is charged in accordance with a certain rate which depends upon the time constant of the combination of condenser 45 and resistor 44.

Figure 7A:
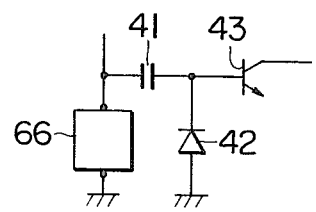
FIG. 7a is a part of FIG. 7 which has been, however, slightly modified.

In the modified circuit shown at FIG. 7a, the remaining parts thereof being the same as those shown in the foregoing FIG. 7 in their structure and connection, sensor 66 may be such as shown in FIG. 5. In this modification, no battery need be connected to the related terminal 60 and thus, resistor 65 may be omitted.

Transistors 48 and 49 are so designed and arranged that they oscillate in the seesaw mode, the frequency being determined by the time constant of condensers 50 and 51 and the resistors 52; 53 and 54; 55 connected thereto. When condenser 45 is charged and the input voltage at the transistor 46 is elevated, the transistor will become conductive. Thus, the charge of condenser 50 is discharged through resistor 47 and the seesaw frequency of the transistors 48; 49 will transfer to a higher pitch level.

In this case, the related circuit constants may easily selected so that, with the transistor 46 off, the pitch of the seesaw oscillation is once per second, while with the transistor 46 on, it will be a higher pitch level, such as 3 times per second.

Transistors 56 and 57, together with condenser 62, are so designed and arranged to provide a feedback oscillator which oscillates at a certain predetermined frequency, for instance 2,000 cycles per second, as determined by the constants of output coil 58, condensers 59, 62 and 67 and resistor 61 connected with each other as shown.

Figure 8:
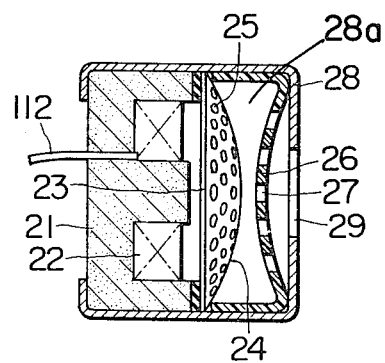
FIGS. 8 and 9 are sectional drawings illustrative two different embodiments of a speaker employable in this invention.
Figure 9A:
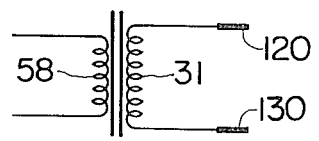
FIG. 9a is a step-up transformer for FIG. 9.
Figure 9:
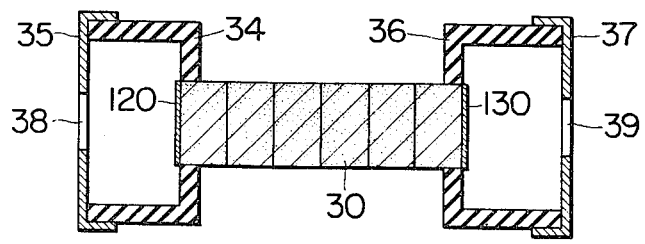

The output coil 58 may take the form of an energizing coil 22 of an electromagnetic speaker shown in FIG. 8, or alternatively of secondary winding 58, FIG. 9a, of a step-up transformer of the piezoelectric speaker shown in FIG. 9.

When the transistor 49, FIG. 7, becomes conductive, the oscillator circuit including transistors 56 and 57 are grounded so that their oscillating operation will cease. Therefore, it will be seen that the oscillation of the transistors 56 and 57 is controlled depending upon the period of seesaw oscillation of the flip-flop circuit including the transistors 48 and 49.

In the circuit shown in FIG. 7, the sensor 40 corresponds to that shown at 1 in FIG. 3, the circuit including transistors 43 and 46 works as the gate circuit 2 of FIG. 3, while the circuit including transistors 48; 49; 56 and 57 corresponds to the discriminating signal generator 3 shown therein.

In the embodiment of the electromagnetic speaker employable in the invention, an energizing coil 22 wound on a core 21 made of high magnetic permeability material is electrically connected through leads 112 to the circuit of FIG. 7 at its right hand end.

Numeral 23 denotes a vibrating plate which is caused to vibrate in relation with the current fed to the coil 22. The thus generated acoustic sounds by the vibration of plate 23 are delivered from outlet opening 29 formed through the wall of casing 28 of the speaker unit, after having been subjected to a dispersing action jointly provided by the openings 25 and 27 formed through respective light metal shells 24 and 26. The effect obtainable by the provision of these shells is such that the acoustic wave planes are well matched. The casing 28 of the unit is made of a metal or plastic thin sheet and the air space 28a formed therein is so designed and arranged to resonate with the oscillation frequency, 2,000 cycles per second as an example, of the transistors 56 and 57.

In an alternative embodiment of the speaker of the piezoelectric type shown in FIG. 9, numeral 30 represents a stack of piezoelectric elements, said stack having at its ends a pair of electrodes 120 and 130. These electrodes are exposed to the interior spaces of respective resonance boxes 34 and 36 which are covered with respective covers 35 and 37, respectively, formed with sounds outlet openings 38 and 39. These electrodes 120 and 130 are connected electrically with the both ends of secondary winding 31 of a step-up transformer having primary winding 58 as shown in FIG. 9a, and designed and arranged to oscillate at 2,000 cycles per second as an example. The primary winding 58 corresponds to output coil 58 shown in FIG. 7.

When a movable body such as a hunting dog carries the sensor unit and moves, current will be supplied from the sensor proper 40 to the output coil 58 and thus, audio sounds of 2,000 cycles per second, as an example, will be delivered from the speaker at a rate of once per second.

On the contrary, when the dog makes a dead stop, and after lapse of a certain predetermined time period, say 5 seconds, which corresponds to the charging rate of condenser 45, the acoustic signals of 2,000 cycles per second will be delivered from the speaker with rather shorter pitches or at rather shorter time intervals, say three times per second, which can be easily discriminated by the hunter who is in audible proximity to the dog, from the foregoing rather longer time intervals corresponding to the moving state of the dog.

It will be seen from the foregoing that mechanical shocks of the inertia member 10 or 17 are electrically sensed and the corresponding electrical signals are delivered to the gate circuit 2 for actuation thereof and for the control of the discriminating signal generating circuit 3. In this case, if the acoustic signals, say 2,000 cycles per second, issuing from the speaker should be fed back to the sensor 1, the fed-back energy could not be amplified at the gate circuit. Therefore, the whole unit can operate under a highly stabilized condition.

Under occasion, the speaker 4 shown in FIG. 3 may be replaced such a device wherein the delivered signal is fed to a radio frequency oscillator and the delivered radio waves are modulated with the foregoing 2,000 cycles per second. By receiving and demodulating such modulated radio frequency, the hunter can discriminate move- or stop condition of his dog even if the latter hunting at a rather remote place outside of the audibly discriminating region.

Figure 10:
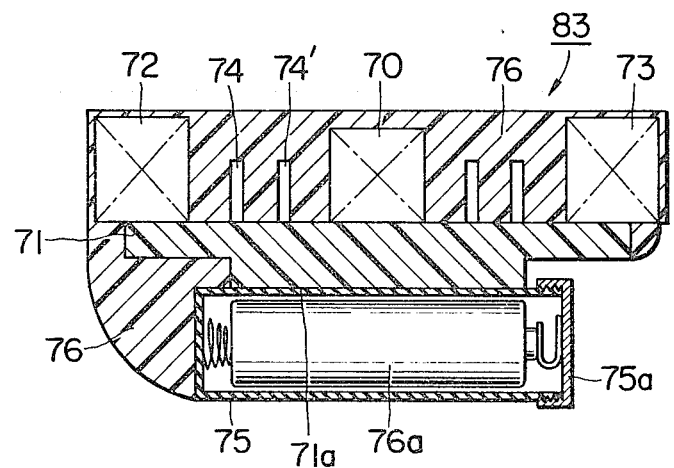
FIG. 10 is a sectional drawing of a further embodiment equipped with an audio signal generator.
Figure 11:
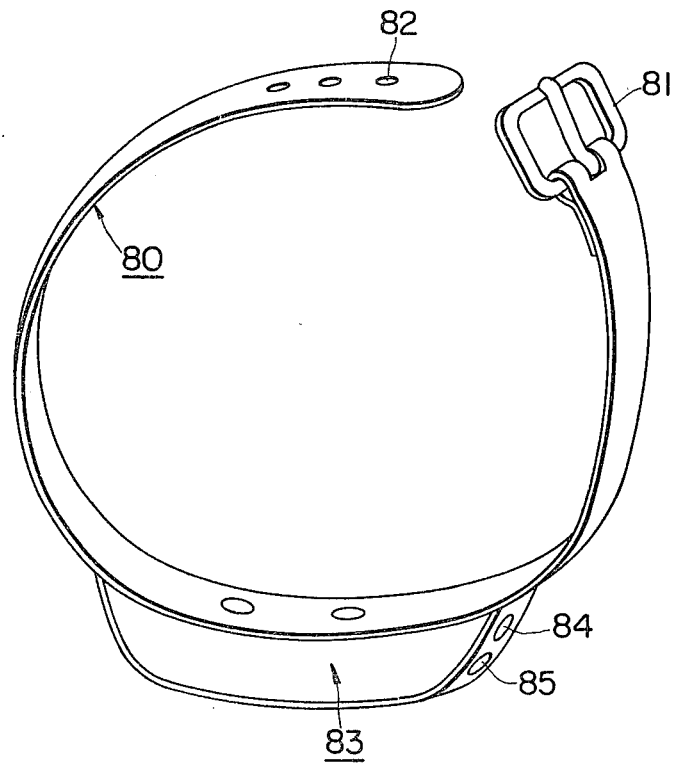
FIG. 11 is a schematic perspective view of a whole move-stop discriminator unit attached fixedly to a neckband of the hunting dog.

In a more specific embodiment of the sensor unit according to this invention shown in FIG. 10, numeral 71 represents a plastic resin-made frame which mounts a sensor proper similar to that shown in FIG. 4 or 5. Numerals 72 and 73 represent speakers similar to those shown and described in the foregoing these speakers have been designed and arranged capable of delivering bird's call, singing or the like audio signals, having say 2,000 cycles per second or the like tone frequency, which may be highly aquainted to birds and unharmful to hunting dogs and further very sensible by hunters. Two transistors 74 and 74' are shown only schematically and representative of several transistors employed in the circuit arrangement shown in FIG. 7 or 7a.

Battery 76 is housed in a casing 75 which is fixedly attached to the bottom surface 71a of frame 71, the said casing is provided with a detachable cap 75a. The parts 70; 72; 73; 74 and 74' are moulded in a plastic filler material 76. In this way, a sensor unit 83 is provided which is to be attached to a dog's neck band 80 having a buckle 81 attached to the root end of the neck band and cooperable with one of a series of perforations 82 bored through the opposite end region of the band 80. Numeral 84 represents an outlet opening of the speaker 72 or 73 for delivery of acoustic sounds and similar to that shown 38; 39 or 29 in the foregoing. Further numeral 85 illustrates a further opening for introducing the battery 76a in position of taking out same from position. These openings 84 and 85 have been shown only schematically to show their position.

Figure 12:
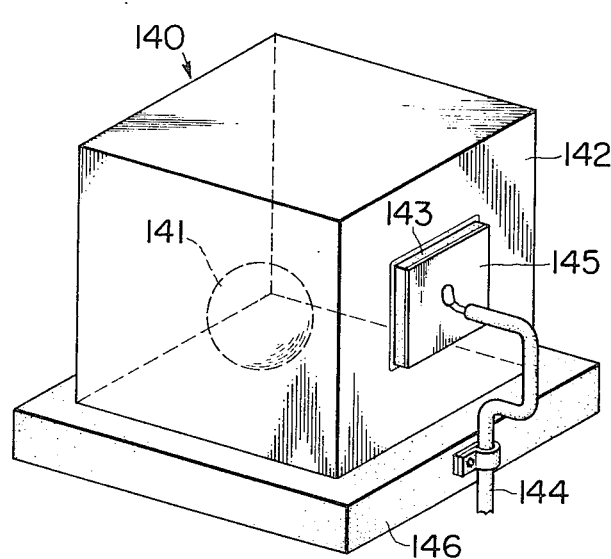
FIG. 12 is a perspective view of a still further embodiment of sensor proper according to this embodiment.
Figure 13:
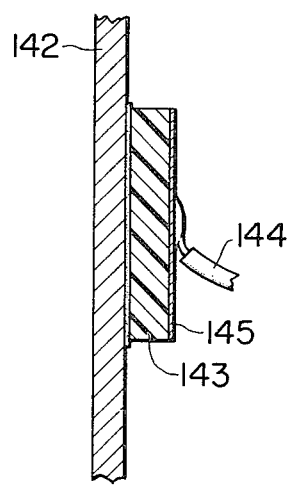
FIG. 13 is an enlarged section view of a part of the embodiment shown in FIG. 12.

In FIG. 12, a still further embodiment of the sensor proper is shown which comprises a rectangular box casing 140. Each side thereof may be 10–14 mm. Each wall of this box casing is formed a thin metal plate, preferably of phosphor bronz, having a thickness of 0.2–0.4 mm, preferably 0.3 mm. The six side walls have been united together by soldering, brazing, fusing or the like conventional fixing technique.

A rigid metal sensing ball 141, having a diameter of several millimeters, preferably 4 mm or even smaller, has been placed within the inside hollow space of a box casing. A thin sheet of piezoelectric ceramic 143 is glued, preferably through the intermediary of an electrode sheet, not shown, to the outer flat surface of one of the casing walls as at 142. An opposite electrode sheet 145 is fixedly attached to the exposed outer surface of the piezoelectric ceramic plate 143 and the root end of a wire lead 144 is soldered the electrode 145, while the opposite free end of the lead is electrically connected to earth point of the circuit shown in FIG. 14.

Sensor box casing 140 is placed on a cushion sheet 146 of a soft and porous material which is fixed directly or indirectly to a movable member to be sensed. In case when the movable member is stationary, the ball 141 does not move and sits also still on the surface of one of walls, most on the bottom wall. In such occasion, there is no electric voltage induced in the piezoelectric ceramic 143.

On the contrary, when the member moves slightly, then the ball 141 mqves and hits the surface of one of the casing walls. As the walls are made from a thin plate of phosphor bronze, the vibration of the wall material caused thereby will yield a natural resonance of sound inside the space of sensor box 140. Therefore, any shock caused by the collision by the ball 141 against one of the casing walls is effectively transmitted to the piezoelectric ceramic plate, thereby yielding a voltage output therefrom.

A restriction of mechanical nature could be invited as a result of supporting mode of the sensor casing 140 and it may reduce the build-up of the effective vibration of walls produced by a hit or attack of the moving ball 141. Therefore, the material of cushion sheet 146 must be selected carefully so that the effective resonation of vibration of walls may not be disturbed or restricted. As found by a careful design and a number of practical experiments, the use of one piece of piezoelectric ceramic 143 is enough to sense well even a slight movement of ball 141 and therefore the slightest movement of the movable member in any direction can be detected sensibly and effectively.

Figure 14:
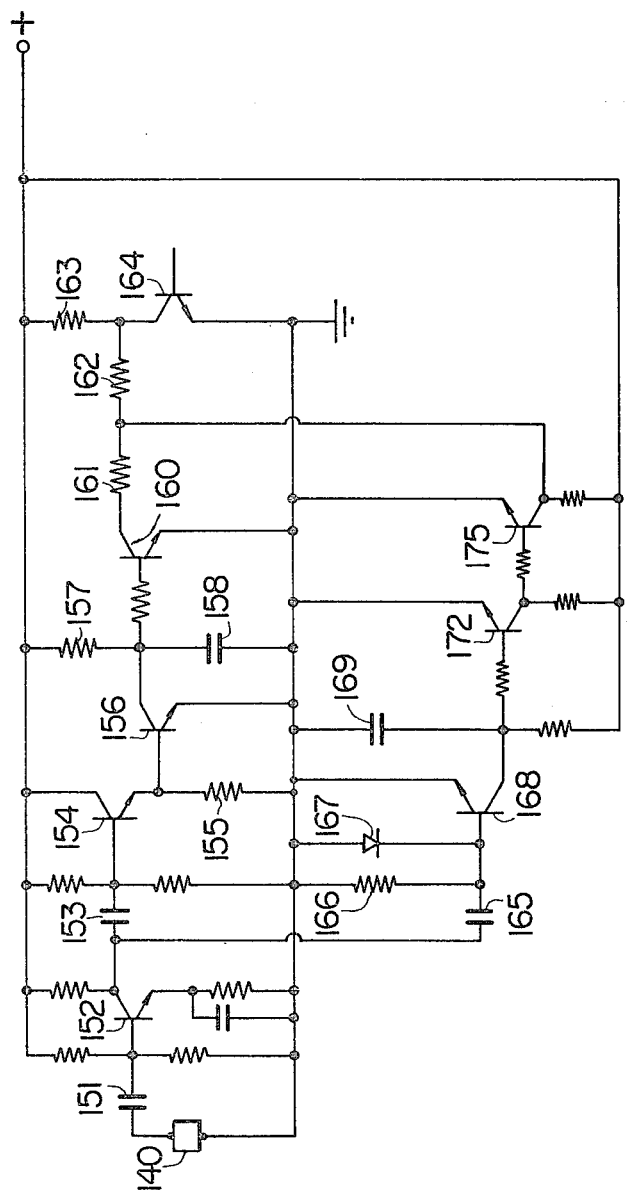
FIG. 14 is a wiring diagram of a still further embodiment of electronic circuit employable in the invention and in combination with the last embodiment of sensor proper shown in FIG. 12.

In the circuit shown in FIG. 14, the sensor 140 is used and arranged in position as shown and the output voltage induced in the sensor is coupled through a condenser 151 to a preamplifing transistor 152. Coupling condensers 153 and 165 will covey the output energy to transistors 154 and 168 simultaneously. However, the combination of the values of these condenser 165 and resistors 166 is selected so that only higher frequency output components from the sensor 140 are amplified by transistor 168 while transistors 154 and 156 work jointly only to charge condenser 158 as was in the case of the charging condenser 45 in FIG. 7.

On the contrary, when the output voltage of sensor 140 is amplified by transistor 156 to get work, the condenser 158 is discharged and the resistor 161 is connected to the earth through transistor 160. It should be noted that the transistor 164 of FIG. 14 is equivalent to the transistor 48 of FIG. 7 and the pitch frequency of the oscillation made by the transistor 164 is set to the first or walking mode of the dog's motion, where the resistor 163 of attributed to transistor 164 is connected to the earth through transistor 160, resistors 161 and 162.

In the case of the second mode of the motion of dog, or pointing mode, no voltage output is delivered by the sensor 140 and therefore, opening of the transistor 156 will charge condenser 158 through resistor 157 with a time constant as set by the values of condenser 158 and resistor 157, and as a result thereof, the transistor 160 will become non-conductive.

In the third mode of motion of the dog which means the galloping mode, ball 141 will move more quickly and frequently to hit the casing walls, and the frequency of output voltage from the piezoelectric ceramic 143 will become higher than that obtainable in the mode of walking of the dog. It means in FIG. 14 that with the similar mechanical hiting effect applied onto the sensor proper 140 by the ball in the third mode of motion of the dog, higher frequency signal will be given from the sensor 140 to the transistor 168 more effectively than to the transistor 154 when the value of condenser 165 is designed to be smaller than that of condenser 153.

The voltage appearing across the resistor 166 is bypassed through a diode 167 at the negative pulse so that the positive pulse will be effectively given to the transistor 168 when the dog runs faster or gallopingly.

In such occasion, transistor 168 discharges the voltage of condenser 169 and lets the transistor 172 open, and the transistor 175 will close or become non-conductive. That means, in the third mode of motion of the dog, the resistor 162 will be connected to the earth through transistor 175 and the pitch of the oscillation of the circuit part including transistor 164 will become higher than in the case of the first mode which means a walking condition of the dog. Thus, the lowest pitch of oscillation at the walking, a little higher pitch at the pointing and very much higher pitch at the galloping of the dog may clearly be discriminated from each other and will be informed to the hunter by different and audible respective signals.

It should be noted at this stage that the sensor operation may substantially be affected depending upon the occasional angle and declination thereof relative to the hunting dog to which the sensor has been attached. However, according to the present invention, or more specifically with the second embodiment thereof shown and described so far, otherwise encountered delicate troubles may be obviated, and indeed, by virtue of the practically no sensitiveness of the sensor to its orientation and the like.

The embodiments of the invention in which an exclusive property or privilege is claimed are as follows:

1. An omnidirectional move-stop sensor, comprising a movable ball placed within a confined space and voltage-inducing means at least partly defining a wall of said space for generating a voltage varying with impact on collision of said ball with said wall, said wall including a material generating a voltage on impact, said ball being freely movable along at least two dimensions during operation.

2. The sensor of claim 1, wherein gate circuit means are connected electrically with said voltage-inducing means for changing its on-off state depending upon move-stop state of said ball.

3. The sensor of claim 2, wherein a discriminating signal generator is electrically connected with said gate circuit means, the former being modified in its operating condition depending upon said on-off state of said gate circuit.

4. The sensor of claim 3, wherein said signal generator comprises a flip-flop as an oscillator, the oscillating frequency of said flip-flop depending upon by the on-off state of said gate circuit means.

5. The sensor of claim 4 for attachment to a hunting dog, wherein said signal generator further comprises an oscillator of a predetermined frequency, in the range 2,000–3,000 Hz electrically connected with said flip-flop, for indicating whether the ball and hence the dog is moving.

6. An omnidirectional move-stop sensor, comprising a movable ball placed within a confined space and voltage-inducing means at least partly defining a wall of said space for generating a voltage on collision of said ball with said wall, said confined space being a hollow structure having a plurality of flat walls, one of said walls including a piezoelectric element having an inside electrode and an outside electrode.

7. An omnidirectional move-stop sensor, comprising a movable object placed within a confined space, and signal-inducing means at least partly defining a wall of said space for generating an electrically sensible signal varying with impact collision of said object with said wall, said wall including a material generating an electrically sensible signal of impact, said object being freely movable along at least two dimensions during operation.

8. The move-stop sensor of claim 7, wherein said signal inducing means comprises a mass of carbon powder confined partially by an outer electrode and an inner electrode, the both defining partially the wall of said confining space.

9. A sensor as in claim 7, wherein said wall is composed of a piezoelectric element having an electrode on the inside of the wall and an electrode on the outside of the wall.

10. A sensor as in claim 7, further comprising gate circuit means electrically connected to said signal inducing means for changing its on-off state depending upon the move-stop state of said object.

* * * * *